United States Patent
Kawabata et al.

(10) Patent No.: US 7,720,205 B2
(45) Date of Patent: *May 18, 2010

(54) COMMUNICATIONS TERMINAL UNIT AND METHOD FOR CONTROLLING THE SAME

(75) Inventors: Hirotaka Kawabata, Iwatsuki (JP); Yoshiharu Sagiya, Iwatsuki (JP); Kazutaka Saitoh, Iwatsuki (JP); Hideki Fujii, Iwatsuki (JP); Yoshihiro Maei, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1171 days.

This patent is subject to a terminal disclaimer.

(21) Appl. No.: 10/370,693

(22) Filed: Feb. 24, 2003

(65) Prior Publication Data

US 2004/0057421 A1   Mar. 25, 2004

(30) Foreign Application Priority Data

Sep. 19, 2002   (JP)   ............... P2002-273951

(51) Int. Cl.
*H04M 11/00* (2006.01)

(52) U.S. Cl. .................. 379/100.12; 379/220.01; 370/352; 709/203; 709/238; 709/239

(58) Field of Classification Search .......... 709/239, 709/238, 203; 370/352; 379/220.01, 100.12
See application file for complete search history.

(56) References Cited

U.S. PATENT DOCUMENTS

| | | | |
|---|---|---|---|
| 5,073,890 A | 12/1991 | Danielsen | |
| 5,638,428 A * | 6/1997 | Berku et al. | 379/100.06 |
| 5,862,202 A | 1/1999 | Bashoura et al. | |
| 6,065,061 A * | 5/2000 | Blahut et al. | 709/239 |
| 6,088,437 A | 7/2000 | Amick | |
| 6,278,707 B1 | 8/2001 | MacMillan et al. | |
| 6,385,179 B1 | 5/2002 | Malcolm et al. | |

(Continued)

FOREIGN PATENT DOCUMENTS

JP    A-07-170383    7/1995

(Continued)

OTHER PUBLICATIONS

Mar. 6, 2006 Office Action issued in U.S. Appl. No. 10/370,594.

(Continued)

*Primary Examiner*—Quynh H Nguyen
(74) *Attorney, Agent, or Firm*—Oliff & Berridge, PLC (57) ABSTRACT

A communication terminal unit has a system control section including a communication error detection section that detects a communication error, which occurs at the time of originating a call over an IP network or a public network. A communication error analysis section analyzes the thus-detected communication error, and in accordance with the result of analysis of the communication error, a call origination network determination section automatically determines whether to re-dial a call over the IP network or the public network. As a result, when detecting a communication error at the time of origination of a call over the IP network or the public network, a system control section performs control operation for analyzing the communication error and automatically determining whether to re-dial a call over the IP network or over the public network.

8 Claims, 8 Drawing Sheets

U.S. PATENT DOCUMENTS

| | | | |
|---|---|---|---|
| 6,519,247 | B1 | 2/2003 | Yoshida |
| 6,628,760 | B2 | 9/2003 | Mirashrafi et al. |
| 6,700,674 | B1 | 3/2004 | Otsuka et al. |
| 6,700,956 | B2 | 3/2004 | Chang et al. |
| 6,711,241 | B1 | 3/2004 | White et al. |
| 6,985,478 | B2 | 1/2006 | Pogossiants et al. |
| 7,092,379 | B1 | 8/2006 | Singh et al. |
| 7,283,270 | B2 | 10/2007 | Boire-Lavigne et al. |
| 7,515,583 | B2 | 4/2009 | Kamani et al. |
| 2002/0002623 | A1 | 1/2002 | Endo |
| 2004/0057421 | A1 | 3/2004 | Kawabata et al. |

FOREIGN PATENT DOCUMENTS

| | | |
|---|---|---|
| JP | A 10-191016 | 7/1998 |
| JP | A-10-191016 | 7/1998 |
| JP | A 10-243019 | 9/1998 |
| JP | A-10-243019 | 9/1998 |
| JP | A-11-205574 | 7/1999 |
| JP | A 11-205574 | 7/1999 |
| JP | A-2000-165578 | 6/2000 |
| JP | A 2000-165578 | 6/2000 |
| JP | A-2000-295393 | 10/2000 |
| JP | A 2000-295393 | 10/2000 |
| JP | A-2001-036641 | 2/2001 |
| JP | A-2001-217929 | 8/2001 |
| JP | A-2002-084395 | 3/2002 |
| KR | 2001-30762 | 4/2001 |
| KR | 2001-0030762 | 4/2001 |
| KR | A-2002-0012252 | 2/2002 |
| KR | A-2003-0021593 | 3/2003 |
| KR | A 2003-0021593 | 3/2003 |
| WO | WO 99/17475 | 4/1999 |

OTHER PUBLICATIONS

Oct. 16, 2006 Final Office Action issued in U.S. Appl. No. 10/370,594.
Mar. 30, 2007 Office Action issued in U.S. Appl. No. 10/370,594.
Sep. 25, 2007 Final Office Action issued in U.S. Appl. No. 10/370,594.
Feb. 6, 2008 Office Action issued in U.S. Appl. No. 10/370,594.
Oct. 29, 2008 Office Action issued in U.S. Appl. No. 10/370,594.
May 8, 2009 Notice of Allowance and Fee(s) Due issued in U.S. Appl. No. 10/370,594.
Sep. 15, 2009 Notice of Allowance and Fee(s) Due issued in U.S. Appl. No. 10/370,594.
Aug. 7, 2007 English-language translation of Japanese Patent Office Action.
Aug. 21, 2007 English-language translation of Japanese Patent Office Action.
Nov. 29, 2005 English-language translation of Korean Office Action.

* cited by examiner

COMMUNICATIONS TERMINAL UNIT AND METHOD FOR CONTROLLING THE SAME

The present disclosure relates to the subject matter contained in Japanese Patent Application No. 2002-273951 filed on Sep. 19, 2002, which is incorporated herein by reference in its entirety.

BACKGROUND OF THE INVENTION

1. Field of the Invention

The present invention relates to a communications terminal unit to be connected to an Internet protocol (IP) network and a public switched telephone network, and to a method for controlling the unit. More specifically, the invention relates to a communications terminal unit having the function of automatically determining whether to originate a call over an IP network or over a public switched telephone network by analyzing a communication error in the event that the communication error has arisen when a call is originated by selection of an IP network or the public switched telephone network, as well as to a method for controlling the unit.

2. Description of the Related Art

For example, some facsimile machines are connected to both an IP network and a public switched telephone network. In the case of a related-art facsimile machine of this type, a user selects "FAX" in which a call is originated over the public switched telephone network, or "iFAX" in which a call is originated over the IP network.

However, in the case of the facsimile machine which originates a call in accordance with the user's selection of a network, an indispensable feature is for all users to be able to ascertain whether or not a call can be originated to a call receiver over the IP network, or whether or not origination of a call over the public switched telephone network incurs a low communication cost.

If this is ignored, there may arise, for example, a case where a waste of communication cost occurs when a call is originated over the public switched telephone network despite the possibility of originating a call over the IP network.

In contrast, when, in spite of the impossibility of originating a call over the IP network, an attempt is made to originate a call over the IP network, a communication error arises.

In this case, the related-art facsimile machine repeats origination of a call over the same network only a predetermined number of times at predetermined re-dialing intervals. In contrast to a case where the party on the other end of the line is busy, communication cannot be established permanently, because a call is originated to a network to which a call cannot essentially be originated.

As mentioned above, in the case of the related-art facsimile machine connected to both the IP network and the public switched telephone network, the user selects one from the IP network and the public switched telephone network, thereby originating a call. However, if an inappropriate network is selected, a call will be originated over, e.g., a network to which a call cannot be originated, thereby inducing a communication error. Thus, the related-art facsimile machine presents a problem of low reliability of information transmission.

SUMMARY OF THE INVENTION

The invention is aimed at solving the problem and providing a communications terminal unit capable of avoiding occurrence of unsuccessful transmission, which would otherwise be caused by a communication error, and of transmitting information in a more reliable manner by automatically switching a network and re-originating a call in the event that a communication error has arisen as a result of selection of an inappropriate network.

In order to achieve the object, according to a first aspect of the invention, there is provided a communications terminal unit connected to an IP network and a public switched telephone network, including: a first line connection section for establishing connection with the IP network when originating a call over the IP network; a second line connection section for establishing connection with the public switched telephone network when originating a call over the public switched telephone network; a communication error detection section for detecting occurrence of a communication error when the first line connection section or the second line connection section establish the connection; a communication error analysis section for analyzing the communication error detected by the communication error detection section; and a determination section for automatically determining whether to re-originate the call over the IP network or over the public switched telephone network in accordance with a result of analysis performed by the communication error analysis section when the communication error detection section has detected the communication error.

According to a second aspect of the invention, there is provided a method for controlling a communications terminal unit which is connected to an IP network and a public switched telephone network and includes a first line connection section for establishing connection with the IP network when originating a call over the IP network, and a second line connection section for establishing connection with the public switched telephone network when originating a call over the public switched telephone network, the method including operations for detecting occurrence of a communication error when the first line connection section or the second line connection section establish the connection; analyzing the detected communication error; and automatically determining whether to re-originate the call over the IP network or over the public switched telephone network in accordance with a result of analysis.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Embodiments of the invention will be described in detail hereinbelow by reference to the accompanying drawings.

Figure 1:
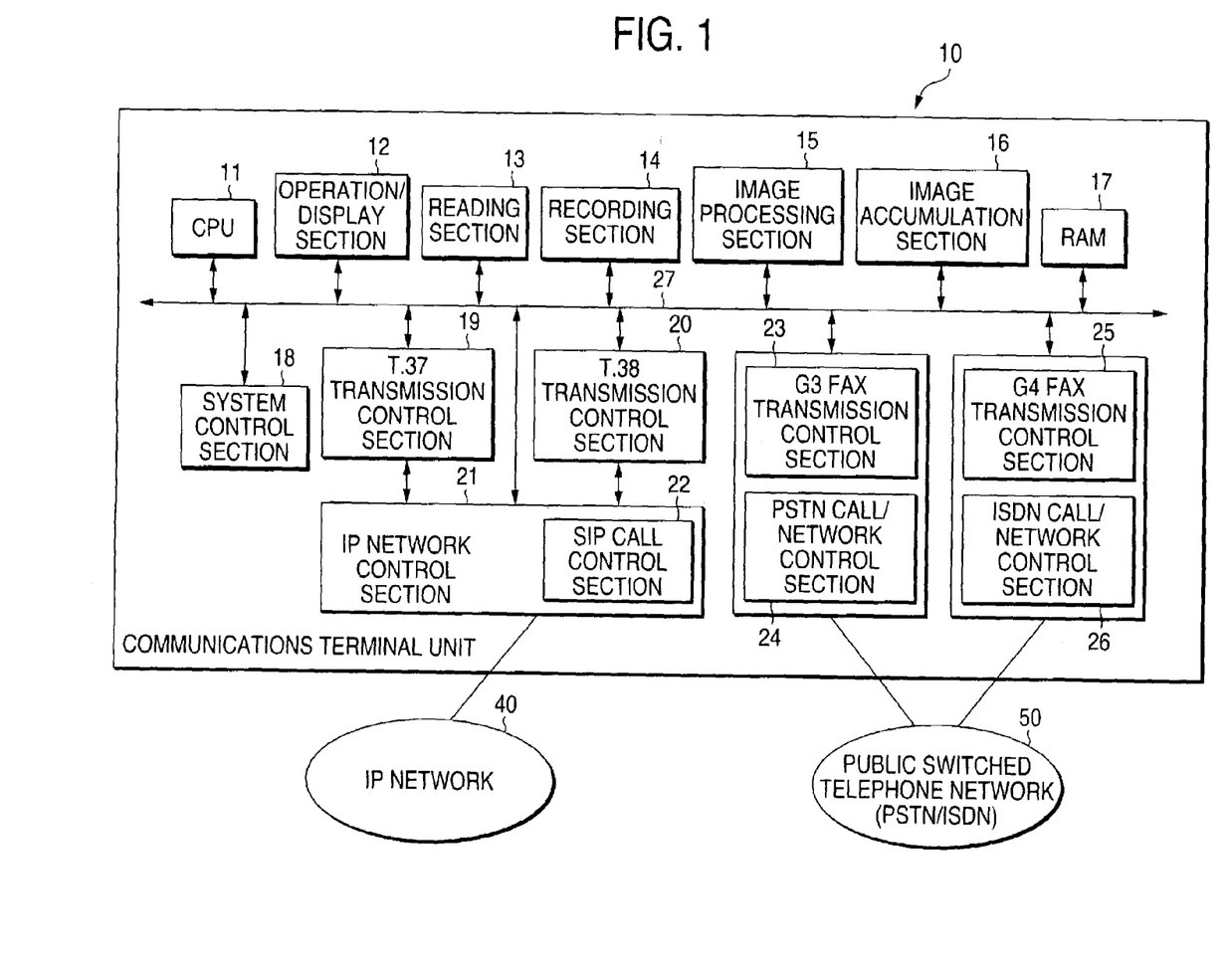
FIG. 1 is a block diagram showing the system configuration of a communications terminal unit according to the invention.

FIG. 1 is a block diagram showing the system configuration of a communications terminal unit according to the invention.

A communication terminal unit 10 has a central processing unit (CPU) 11 for controlling the entire unit; an operation/display section 12 which is constituted of a touch panel or the like, by way of which a user performs various operations (a call originating operation or the like) for activating the unit, and which displays various information items; a reading section 13 for reading an original to be transmitted or copied; a recording section 14 for recording and outputting received image data or read image data on recording paper; an image processing section 15 for subjecting the image data to processing, such as encoding, decoding, enlargement, and reduction; an image accumulation section 16 for storing received image data or read image data; RAM 17 serving as a work area to be used by a control program (system data for controlling operation of the unit and various information items are stored in the work area); a system control section 18 having a program (ROM) for controlling the entire facsimile machine; a T.37 transmission control section 19 for controlling a Store-and-Forward communications protocol in compliance with ITU-T Recommendation T.37 procedures; a T.38 transmission control section 20 for controlling a real-time communications protocol in compliance with ITU-T Recommendation T.38 procedures; an IP network control section 21 which is connected to an Internet protocol (IP) network 40 and performs communication control operation for exchanging various types of data by initiating communication with the Internet; an SIP call control section 22 which is provided in the IP network control section 21 and controls establishment, maintenance, and completion of a call with a real-time Internet FAX T38 through use of procedures defined by RFC3261 (SIP: Session Initiation Protocol) of IETF (Internet Engineer Task Force) and those defined by RFC2327 (SDP: Session Description Protocol); a G3 FAX transmission control section 23 for controlling a facsimile protocol in compliance with the ITU-T recommendation T.30 procedures; a PSTN call/network control section 24 for controlling establishment of a call over an analog public switched telephone network and connection to a network under transmission control of the G3 FAX transmission control section 23; a G4 FAX transmission control section 25 for controlling a G4 facsimile protocol; an ISDN call/network control section 26 for controlling establishment of a call over a digital public switched telephone network and connection to a network under transmission control of the G4 FAX transmission control section 25; and a system bus 27 by way of which data are exchanged among the individual sections of the unit.

The communications terminal unit 10 is connected to the IP network 40 by means of the IP network control section 21 and can communicate with another communications terminal unit at the other end of the line by way of the IP network 40. Further, the communications terminal unit 10 is connected to a public switched telephone network (hereinafter abbreviated as a "public network") 50 by means of the PSTN call/network control section 24 or the ISDN call/network control section 26 and can communicate with another communications terminal unit at the other end by way of the public network 50 (e.g., the PSTN or ISDN).

In the present embodiment, the IP network control section 21 functions as a first line connection section for establishing connection with the IP network, and the G3 FAX transmission control section 23, the PSTN call/network control section 24, the G4 FAX transmission control section 25 and the ISDN call/network control section 26 functions as a second line connection section for establishing connection with the public switched telephone network.

Figure 2:
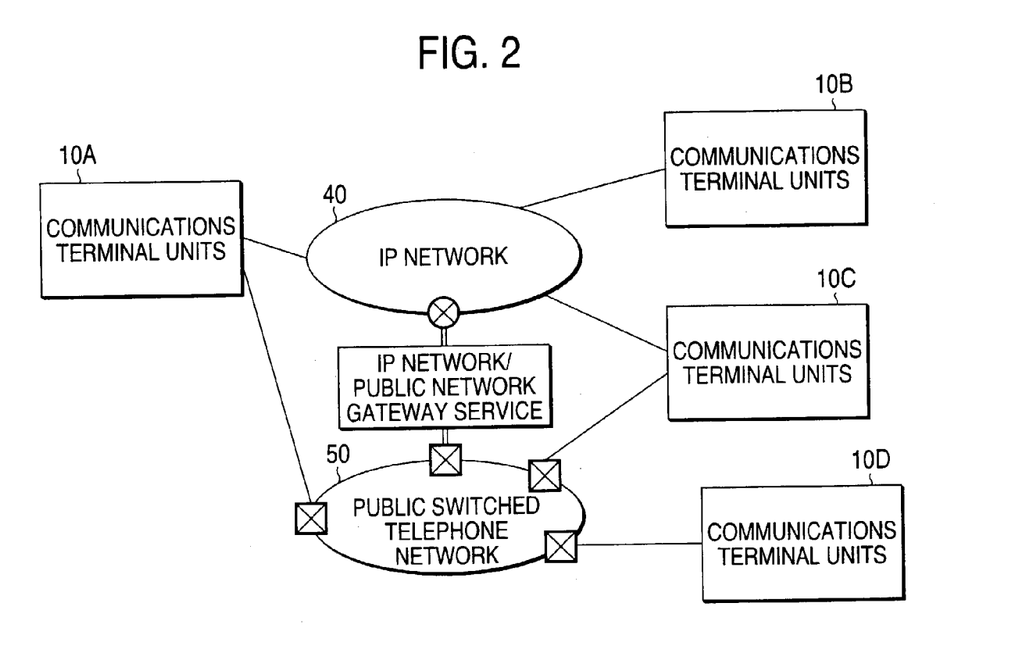
FIG. 2 is a conceptual rendering showing the configuration of a network to which the communications terminal unit of the invention is connected.

FIG. 2 is a conceptual rendering showing the configuration of a network to which the communications terminal unit 10 of the invention is connected.

As shown in FIG. 2, communications terminal units 10A, 10B, 10C, and 10D each employ the communications terminal unit 10 shown in FIG. 1.

Here, the communications terminal units 10A and 10C are connected to the IP network 40 and the public network 50, and the communications terminal unit 10B is connected solely to the IP network 40. Further, the communications terminal unit 10D is connected solely to the public network.

In such a connection environment, for instance, the communications terminal unit 10A can communicate with the communications terminal unit 10B by way of the IP network 40 or with the communications terminal unit 10C by way of the public network 50.

The communications terminal unit 10A can also communicate with the communications terminal unit 10D over the IP network 40 and the public network 50 by means of utilizing gateway service provided between the IP network 40 and the public network 50.

For instance, when the communications terminal unit 10A attempts to effect facsimile transmission to a certain communications terminal unit at the other end, the user inputs a number of the communications terminal unit and selects whether to originate a call over the IP network 40 or over the public network 50, by means of operating keys provided on the operation/display section 12.

At this time, there may arise a case where the user of the communications terminal unit 10A selects the IP network 40 and press a transmission start button in spite of the impossibility of establishing communication to the communications terminal unit at the other end over the IP network 40.

In this case, the communications terminal unit 10A receives an answer signal (i.e., a response) including communication error information; e.g., Not Found, over the IP network 40 and detects a communication error from the communication error information included in the response.

The communications terminal unit of the invention has the function of analyzing the communication error information and automatically determining whether to re-originate a call over the IP network 40 or over the public network 50 when detecting a communication error after having originated a call.

As mentioned above, even when a communication error has arisen as a result of selection of an inappropriate network (e.g., the IP network 40) at the time of origination of a call to the communications terminal unit at the other end, communication can be restored by re-dialing a call by means of switching the network to an appropriate network (e.g., the public network 50).

The system control section 18 can be imparted with a function such as that mentioned above; e.g., a function of analyzing a communication error when detecting a communication error at the time of origination of a call over the IP network 40 or over the public network 50 and automatically determining whether to re-dial a call over the IP network 40 or over the public network 50 in accordance with a result of analysis.

Figure 3:
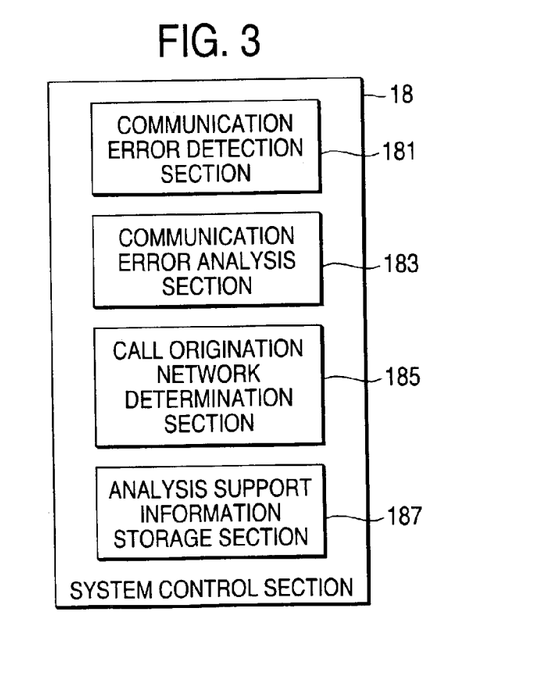
FIG. 3 is a block diagram showing the functional configuration of a system control section of the communications terminal unit according to the invention.

FIG. 3 is a block diagram showing the functional configuration of the system control section 18 of the communications terminal unit 10 according to the invention.

As shown in FIG. 3, the system control section 18 is equipped with a communication error detection section 181, a communication error analysis section 183, a call origination network determination section 185, and an analysis support information storage section 187.

The communication error detection section 181 detects a communication error on the basis of a response from the IP network 40 or the public network 50 to which the call has been originated or a response from a called terminal unit.

The communication error analysis section 183 analyzes a communication error detected by the communication error detection section 181 through use of analysis support information stored in the analysis support information storage section 187, thereby finding a result of analysis; that is, the communication error being an error involving switching of a network (hereinafter called a "network switching error") (such as "Not Found" in which re-origination of a call over the same network becomes useless) or an error not involving switching of a network (hereinafter called a "non-network switching error") (such as a busy state of a communications terminal unit at the other end).

In accordance with a result of analysis of the communication error performed by the communication error analysis section 183, the call origination network determination section 185 automatically determines whether to originate a call over the IP network 40 or over the public network 50.

In the present embodiment, the call origination network determination section 185 functions as a determination section for automatically determining whether to re-originate the call over the IP network or over the public switched telephone network in accordance with a result of analysis performed by the communication error analysis section when the communication error detection section has detected the communication error.

The analysis support information storage section 187 stores analysis support information such as a response code corresponding to "Not Found" or busy, as information required for the communication error analysis section 183 to analyze a communication error.

Next, the call origination network determination control operation to be performed by the communications terminal unit 10 of the invention will be sequentially described by reference to specific embodiments.

First Embodiment

Figure 4:
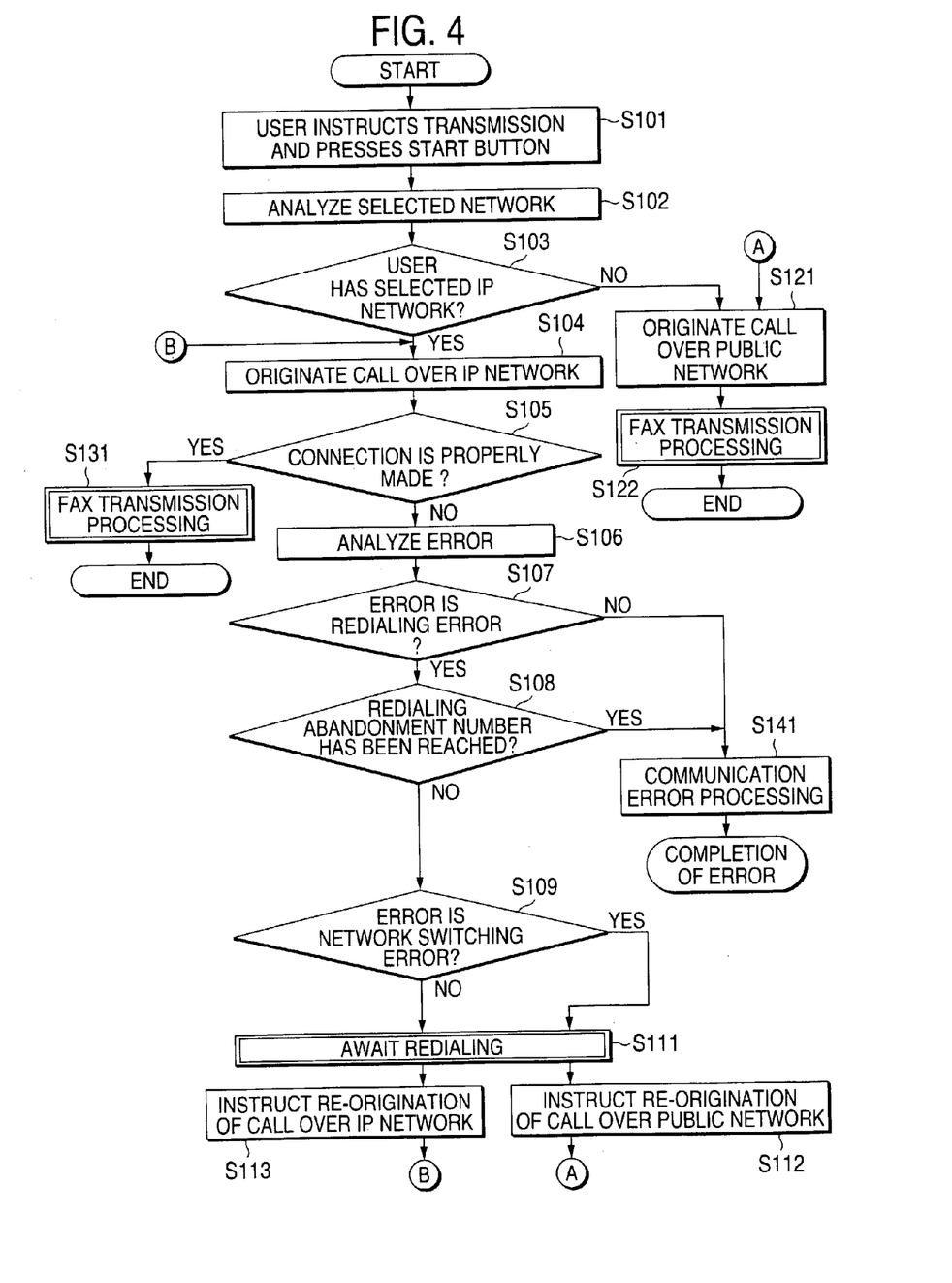
FIG. 4 is a flowchart showing call origination control operation to be performed by a communications terminal unit according to a first embodiment of the invention.

FIG. 4 is a flowchart showing call origination control operation to be performed by a communications terminal unit 10 according to a first embodiment. Here, the communications terminal unit 10 performs call origination control operation corresponding to facsimile communication (e.g., transmission of a document).

In relation to the communications terminal unit 10 of the embodiment, when initiating communication (e.g., transmission of a document) with a communications terminal unit at the other end, a user inputs a number of the communications terminal unit at the other end, by utilization of a ten-key pad or the like provided on the operation/display section 12; selects a network through use of a network selection button; and presses a transmission start button, thereby issuing a transmission instruction (step S101).

Upon receipt of the transmission instruction, the system control section 18 analyzes the network selected through the network selection operation (step S102).

During the network analysis operation, a check is made as to whether or not the user has selected the IP network 40 (step S103). If the user has not selected the IP network 40 (when NO is selected in step S103), control operation is performed so as to instruct the PSTN call/network control section 24 or the ISDN call/network control section 26 to initiate origination of a call, to thereby originate a call over the public network 50 (step S121).

By means of such a call originating operation, control of a call to the communications terminal unit at the other end is completed. When communication has been established, facsimile transmission operation is performed by way of the public network 50 (step S122), and the operation is completed as a result of completion of transmission.

In relation to the facsimile transmission processing pertaining to step S122, for example, after the image processing section 15 has performed image processing on image information about the transmission original read by the reading section 13, the thus-processed information is accumulated in the image accumulation section 16. In a case where the communications terminal unit at the other end is a G3-compatible machine, the image data that have finished undergoing image processing are read from the image accumulation section 16, and the thus-read image data are transmitted to the G3 FAX transmission control section 23. Moreover, the image data are transmitted to the communications terminal unit at the other end by way of the PSTN call/network control section 24 and the public network (PSTN network) 50.

In a case where the communications terminal unit at the other end is a G4-compatible machine, the image data that have finished undergoing image processing are read from the image accumulation section 16, and the thus-read image data are transmitted to the G4 FAX transmission control section 25. Moreover, the image data are transmitted to the communications terminal unit at the other end from the ISDN call/network control section 26 by way of the public network (ISDN network) 50.

When the user has selected the IP network 40 (when YES is selected in step S103), control operation is performed so as to instruct the SIP call control section 22 to start originating a call, thereby originating a call over the IP network 40 (step S104).

After having originated a call, the system control section 18 checks whether or not the communication error detection section 181 has detected an error; that is, whether or not connection has been established normally, on the basis of a response transmitted from the IP network 40 or the communications terminal unit at the other end (step S105).

Here, when connection has been established properly (when YES is selected in step S105), facsimile transmission operation is performed (step S131), and operation is completed by means of completion of transmission operation.

For instance, in relation to the facsimile transmission processing pertaining to step S131, after the image processing section 15 has performed image processing on the image information about the transmission original read by the reading section 13, the image information is accumulated in the image accumulation section 16. Further, the image data that have finished undergoing image processing are read from the image accumulation section 16, and the thus-read image data are transmitted to the T.37 transmission control section 19 or the T.38 transmission control section 20. The T.37 transmission control section 19 or the T.38 transmission control section 20 transmits the image data to the communications terminal unit at the other end by way of the IP network control section 21 and the IP network 40.

In step S105, on the basis of a response transmitted from the IP network 40 or the communications terminal unit at the other end, the communication error detection section 181 detects a communication error. When connection has not been properly established (when NO is selected in step S105), the communication error analysis section 183 analyzes the communication error (step S106).

Through analysis of a communication error, there is found a result of analysis from a received response code or the like; that is, a result indicating occurrence of a mere busy status of a terminal or indicating that re-origination of a call becomes useless because of "Not Found."

Next, the call origination network determination section 185 determines whether or not the communication error is a redialing error for which communication can be sufficiently restored by re-dialing operation (S107).

Here, when the response code indicates a status of failure that cannot be recovered by re-dialing (i.e., a non-redialing error) such as a failure in gateway server (when NO is selected in step S107), operation is completed (i.e., the error is completed) by performing communication error processing (step S141).

In contrast, when the communication error is a redialing error (i.e., an error other than the non-redialing error) (when YES is selected in step S107), a determination is made as to whether or not the terminal unit of calling party has dialed a predetermined number of times; that is, whether or not the number of dialing operations has reached a dialing abandonment number (step S108).

Here, when the redialing abandonment number has been reached (when YES is selected in step S108), communication error processing is performed (step S141), thereby terminating the operation.

When the redialing abandonment number has not yet been reached (when NO is selected in step S108), a determination is made as to whether or not the communication error is a network switching error for which communication can be recovered by means of switching a network; e.g., Not Found (step S109).

When the communication error is a network switching error, such as Not Found (when YES is selected in step S109), the call origination network determination section 185 determines a call to be originated over the public network 50. After having remained in a standby condition for only a period of time corresponding to a preset redialing interval (i.e., a redialing awaiting state) (step S111), the call origination network determination section 185 instructs the PSTN call/network control section 24 or the ISDN call/network control section 26 Lo originate a call over the public network 50 (step S112).

In accordance with the instruction, processing proceeds to step S121, where the PSTN call/network control section 24 or the ISDN call/network control section 26 originates a call over the public network 50. When a call is established after having been originated, facsimile transmission to the communications terminal unit at the other end is carried out (step S122), and operation is terminated after completion of transmission.

When a network is switched, a call may be originated immediately without performance of an operation for awaiting redialing operation (step S111).

If the error is a non-network switching error such as the busy state of a terminal unit at the other end (when NO is selected in step S109), the call origination network determination section 185 determines origination of a call over the IP network. After redialing operation has been awaited in the manner set forth (step S111), the IP network control section 21 is instructed to originate a call over the IP network 40 (step S113).

In accordance with the instruction, processing proceeds to step S104, where the IP network control section 21 originates a call over the IP network 40. When connection has been made properly after origination of a call (when YES is selected in step S105), facsimile transmission to the communications terminal unit at the other end is performed (step S131), and operation is terminated by completion of transmission.

Figure 5:
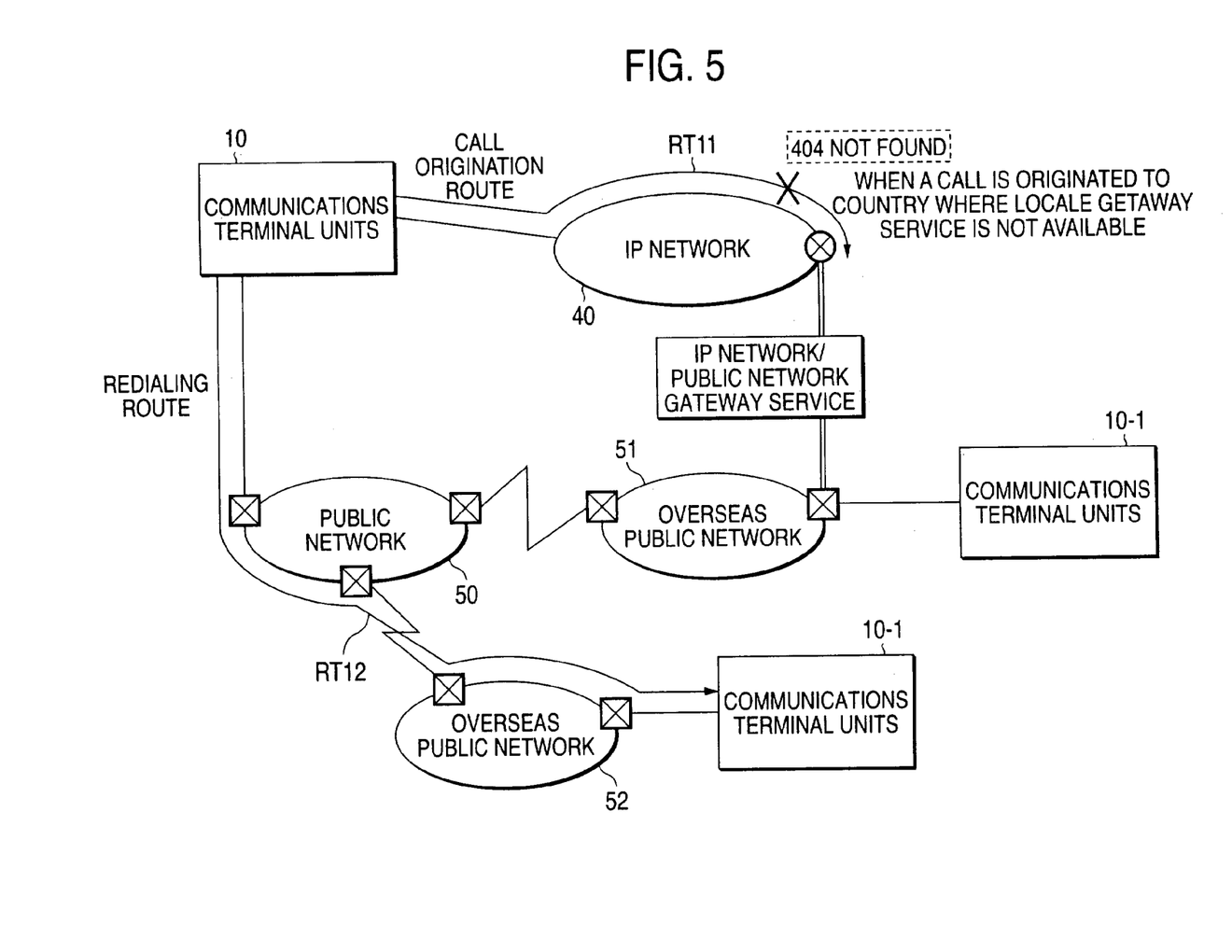
FIG. 5 is a conceptual rendering showing an example of communication flow based on call origination operation control shown in FIG. 4 to be performed by the communication terminal unit of the first embodiment.

FIG. 5 is a conceptual rendering showing an example flow of communication based on call origination operation control to be performed by the communication terminal unit 10 of the first embodiment (see FIG. 4).

As shown in FIG. 5, the communications terminal unit 10 is connected to the IP network 40 and the public network 50. The communications terminal unit 10-1 is connected solely to an overseas public network 51. Further, the IP network 40 is connected to the overseas public network 51 by means of locale IP network/public network gateway service. The public network 50 is connected further to the overseas public network 51 and an overseas public network 52 by means of satellite communication or submarine cables.

In this connection environment, when the communications terminal unit 10 has originated a call over the IP network 40 while a country which does not offer locale gateway service (a communications terminal unit at the other end) is taken as a destination, the call is originated along a communications route RT11 (call origination route).

In this case, status code 404 "Not Found" is returned from the IP network 40, and a connection error arises.

In this way, when a call is originated over the IP network 40 and a connection error has arisen for reasons of "Not Found," the communication error detection section 181 of the system control section 18 detects the communication error. The communication error analysis section 183 analyzes the communication error. On the basis of a result of analysis of the communication error, the call origination network determination section 185 determines origination of a call over the public network 50, to thereby perform a control operation for re-originating a call over the public network 50. In the drawing, RT12 denotes a communication route (redialing route) to be employed at this time.

In this case, the communications terminal unit 10 can establish a call with the communications terminal unit 10-1 (to which connection can be made over only the public network) through the communication route RT12 by way of the public network 50 and the overseas public network 52. Thus, the communications terminal unit 10 can communicate with the communications terminal unit 10-1 by way of the communications route RT12.

In this way, in the communications terminal unit 10 of the first embodiment, the user has originated a call over the IP network 40 by selection of the same. However, when establishment of a call to the communications terminal unit at the other end has failed for reasons of a communication error unique to the IP network 40, the call is redialed over the public network 50.

By means of such a control operation, even when a communication error arises as a result of a call having been originated to a communications terminal unit at the other end to which a call cannot be originated over the IP network 40, a connection to the communications terminal unit at the other end can be established by switching the network to the public network 50, thereby recovering communication.

A call origination network switching control operation of the first embodiment may be practiced while being limited to origination of a call to numbers other than those starting with "050."

Second Embodiment

Figure 6:
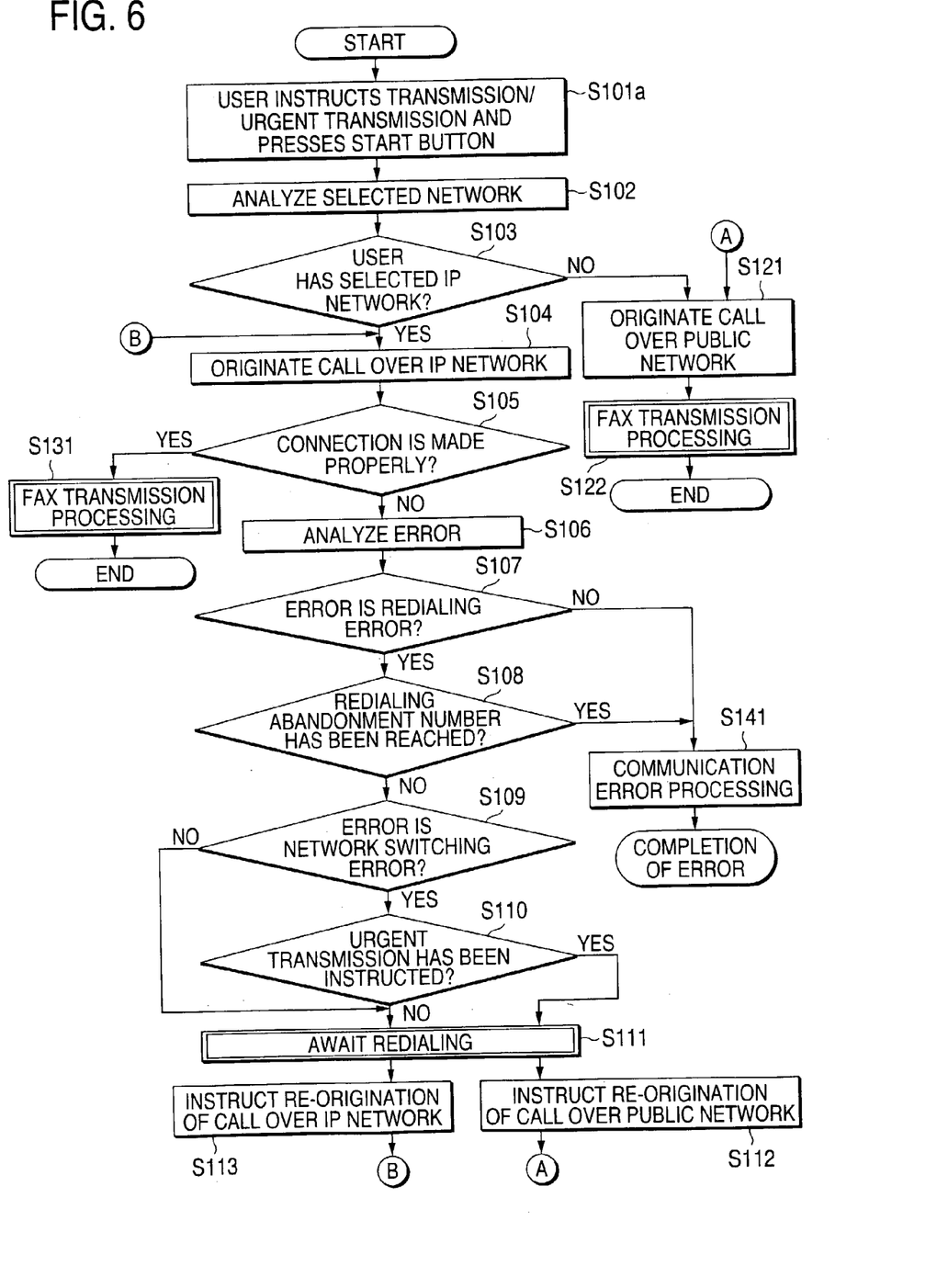
FIG. 6 is a flowchart showing call origination control operation of a communications terminal unit according to a second embodiment of the invention.

FIG. 6 is a flowchart showing call origination control operation of the communications terminal unit 10 according to a second embodiment of the invention.

The call origination control operation of the communications terminal unit 10 of the second embodiment is identical with that of the communications terminal unit 10 of the first embodiment, except for processing pertaining to steps S101a and S110.

Here, descriptions are primarily given of the processing pertaining to steps S101a and S110, and detailed explanations of processing pertaining to other steps are omitted.

When the communications terminal unit 10 of the second embodiment attempts to initiate communication (e.g., transmission of a document) with the communications terminal unit at the other end, the user enters the number of the communications terminal unit at the other end by utilization of a ten-key pad of the operation/display section 12, and selects a network over which a call is to be originated, through use of the network selection button. In the case of transmission of an urgent document, an "urgent" button is pressed, thereby issuing an urgent transmission instruction. Subsequently, the user presses the transmission start button, thereby issuing a transmission instruction (step S101a).

Then, processing proceeds to steps S102 to S109. In step S109, when occurrence of a network switching error, such as "Not Found," is determined (when YES is selected in step S109), the call origination network determination section 185 checks whether or not the instruction corresponds to an "urgent transmission" instruction by reference to the information entered at the time of call origination operation pertaining to step S101a (step S110).

Here, when the instruction is an "urgent transmission" instruction (when YES is selected in step S110), the call origination network determination section 185 determines origination of a call over the public network 50. After having awaited for only a period of time corresponding to a preset redialing interval (i.e., re-dialing awaiting operation) (step S111), the call origination network determination section 185 instructs the PSTN call/network control section 24 or the ISDN call/network control section 26 to originate a call over the public network 50 (step S112).

In accordance with the instruction, processing proceeds to step S121, where the PSTN call/network control section 24 or the ISDN call/network control section 26 originates a call over the public network 50. When connection is made after origination, facsimile transmission to the communications terminal unit at the other end is performed (step S122). After completion of transmission, operation is terminated.

When a network is switched, a call may be originated immediately without awaiting redialing operation (step S111).

When the instruction is not an "urgent transmission" instruction (when NO is selected in step S110), the call origination network determination section 185 determines origination of a call to the IP network 40. After having awaited redialing operation in the manner mentioned previously (step S111), the call origination network determination section 185 instructs the IP network control section 21 to originate a call over the IP network 40 (step S113).

In accordance with the instruction, processing proceeds to step S104, where the IP network control section 21 originates a call over the IP network 40. When connection has been made properly after origination of a call (when YES is selected in step S105), facsimile transmission to the communications terminal unit at the other end is performed (step S131), and operation is terminated by completion of transmission.

In this way, in the case where transmission of a document having great urgency is to be performed by the communications terminal unit 10 of the second embodiment, the user instructs "urgent transmission," and enters the number (facsimile number) of the communications terminal unit at the other end by use of an interface (i.e., the operation/display section 12).

When origination of a call over an IP network is prioritized in order to curtail communication costs, an attempt is made to originate a call over the IP network 40. When for any reason an error has arisen in a connection to the communications terminal unit at the other end over the IP network 40, a check is made as to whether or not an "urgent transmission" is instructed (see S110 in FIG. 6).

When an "urgent transmission" is instructed, the communication error analysis section 183 analyzes the type of the communication error. If the call origination network determination section 185 determines the possibility of making connection over the public network 50, redialing is performed while the network is switched to the public network 50. If the "urgent transmission" is not instructed, redialing of a call is also performed by way of the IP network 40.

In this way, in the event that a communication error arises as a result of origination of a call over the IP network 40, a call is originated over the public network 50 only when "urgent transmission" is instructed. As a result, urgency can still be maintained, although communication costs are sacrificed somewhat.

Third Embodiment

Figure 7:
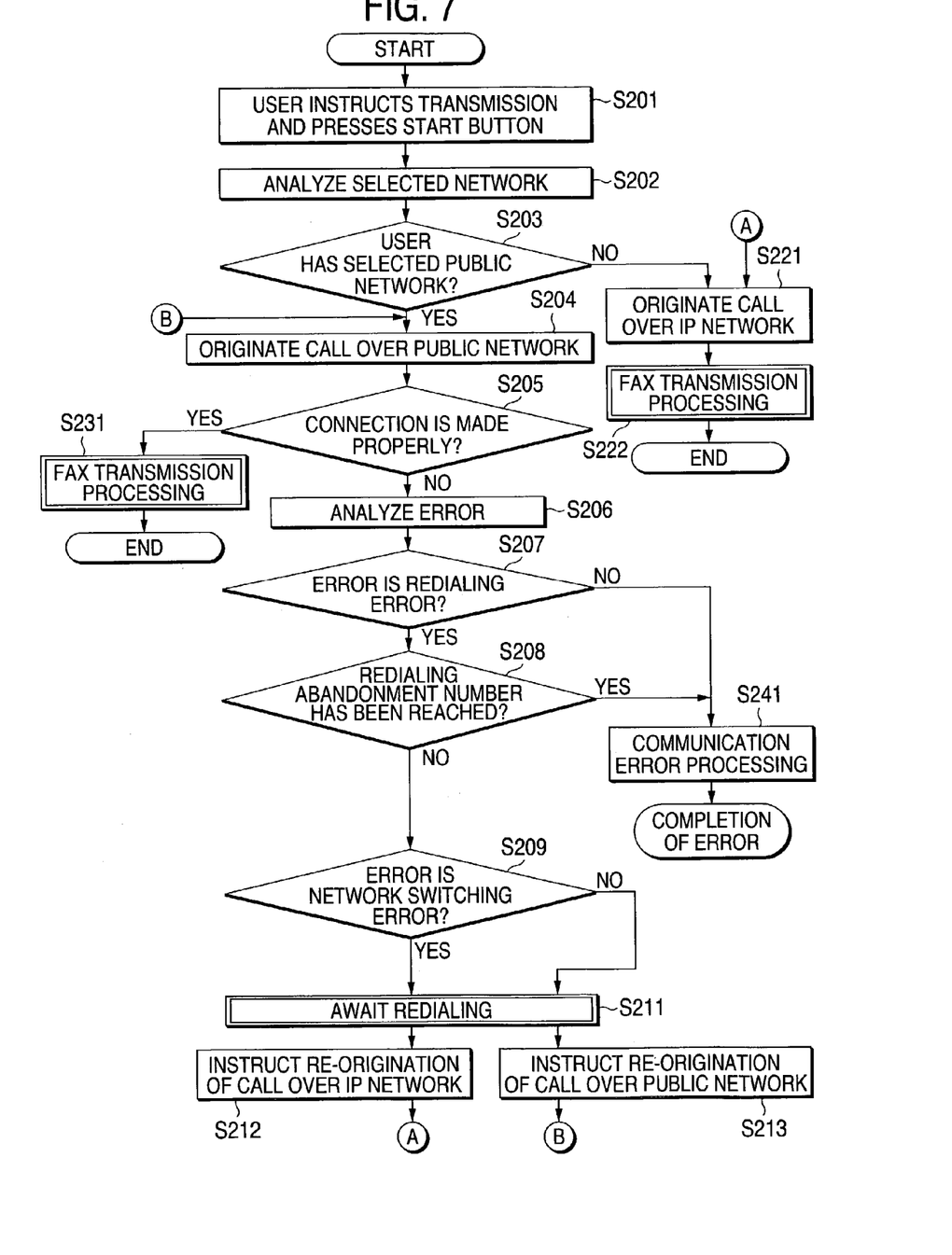
FIG. 7 is a flowchart showing call origination control operation shown in FIG. 6 to be performed by a communications terminal unit according to a third embodiment of the invention.

FIG. 7 is a flowchart showing call origination control operation of the communications terminal unit 10 according to a third embodiment of the invention. The communications terminal unit 10 performs a call origination control operation corresponding to facsimile transmission (transmission of a document).

When the communications terminal unit 10 of the third embodiment initiates communication (transmission of a document) with the communication terminal unit at the other end, the user enters the number of the communications terminal unit at the other end by utilization of a ten-key pad of the operation/display section 12, and selects a network over which a call is to be originated, through use of the network selection button. The user then presses a transmission start button, thereby issuing a transmission instruction (step S201).

Upon receipt of the transmission instruction, the system control section 18 analyzes a network selected through the network selection operation (step S202).

During the network analysis operation, a check is made as to whether or not the user has selected the public network 50 (step S203). If the user has not selected the public network 50 (when NO is selected in step S203), there is performed an operation for instructing the SIP call control section 22 to initiate origination of a call over the IP network 40 (step S221).

By means of such call origination operation, control of a call to the communications terminal unit at the other end is completed. When communication has been established, facsimile transmission is performed by way of the IP network 40 (step S222), and operation is terminated by completion of transmission.

If the user has selected the public network 50 (when YES is selected in step S203), there is performed control operation for instructing the PSTN call/network control section 24 or the ISDN call/network control section 26 to initiate origination of a call, thereby originating a call over the public network 50 (step S204)

After origination of a call, the system control section 18 checks whether or not the communication error detection section 181 has detected a communication error; that is, whether or not connection is made properly, on the basis of a response from output from the public network 50 or the communications terminal unit at the other end (step S205).

When communication is made properly (when YES is selected in step S205), facsimile transmission is performed (step S231), and operation is terminated by completion of transmission.

If in step S205 the communication error detection section 181 is determined to have detected a communication error on the basis of the response output from the public network 50 or the communications terminal unit at the other end and connection is determined to have not been made properly (when NO is selected in step S205), the communication error analysis section 183 analyzes the communication error (step S206).

Through analysis of the communication error, a result of analysis; that is, occurrence of a mere busy status of the terminal unit or an error which cannot be recovered by re-origination of a call, for reasons of a failure in the IP network/public network gateway service, is determined from the received response.

Next, the call origination network determination section 185 determines whether or not the communication error can be recovered by redialing operation, through use of the communication error analysis result (step S207).

If the response indicates a problem, such as a failure in the IP network/public network gateway service, and the error cannot be recovered by redialing (i.e., a non-redialing error (when NO is selected in step S207), operation is terminated (the error is terminated) by performing communication error processing (step S241).

If the communication error is a redialing error (i.e., an error other than the non-redialing error) (when YES is selected in step S207), a determination is made as to whether or not the number of redialing operations previously determined by the call originating terminal has been reached; that is, whether or not a dialing abandonment number has been reached (step S208).

If the redialing number abandonment number has been reached (when YES is selected in step S208), operation is terminated (i.e., the error is terminated) by communication error processing (step S241).

When the redialing abandonment number has not been reached (when NO is selected in step S208), a determination is made whether or not the communication error is a network switching error for which communication can be restored by switching a network, such as a failure in the IP network/public network gateway service (step S209).

Here, when the communication error is a network switching error (when YES is selected in step S209), the call origination network determination section 185 determines origination of a call over the IP network 40. After having awaited for only a period of time corresponding to a preset redialing interval (i.e., after having awaited redialing operation) (step S211), the call origination network determination section 185 instructs the SIP call control section 22 to originate a call over the IP network 40 (step S212).

In accordance with the instruction, processing proceeds to step S221, where the SIP call control section 22 originates a call over the IP network 40. After a call has been established after origination, facsimile transmission to the communications terminal unit at the other end is performed (step S222). After completion of transmission, operation is terminated.

When a network is switched, a call may be originated immediately without awaiting redialing operation (step S211).

When the communication error is a non-network switching error (when NO is selected in step S209), the call origination network determination section 185 determines origination of a call over the public network 50. After having awaited redialing operation in the manner mentioned previously (step S211), the call origination network determination section 185 instructs the PSTN call/network control section 24 or the ISDN call/network control section 26 to originate a call over the public network 50 (step S213).

In accordance with the instruction, processing proceeds to step S204, where the PSTN call/network control section 24 or the ISDN call/network control section 26 originates a call over the public network 50. When connection has been made properly after origination of a call (when YES is selected in step S205), facsimile transmission to the communications terminal unit at the other end is performed (step S231), and operation is terminated by completion of transmission.

Figure 8:
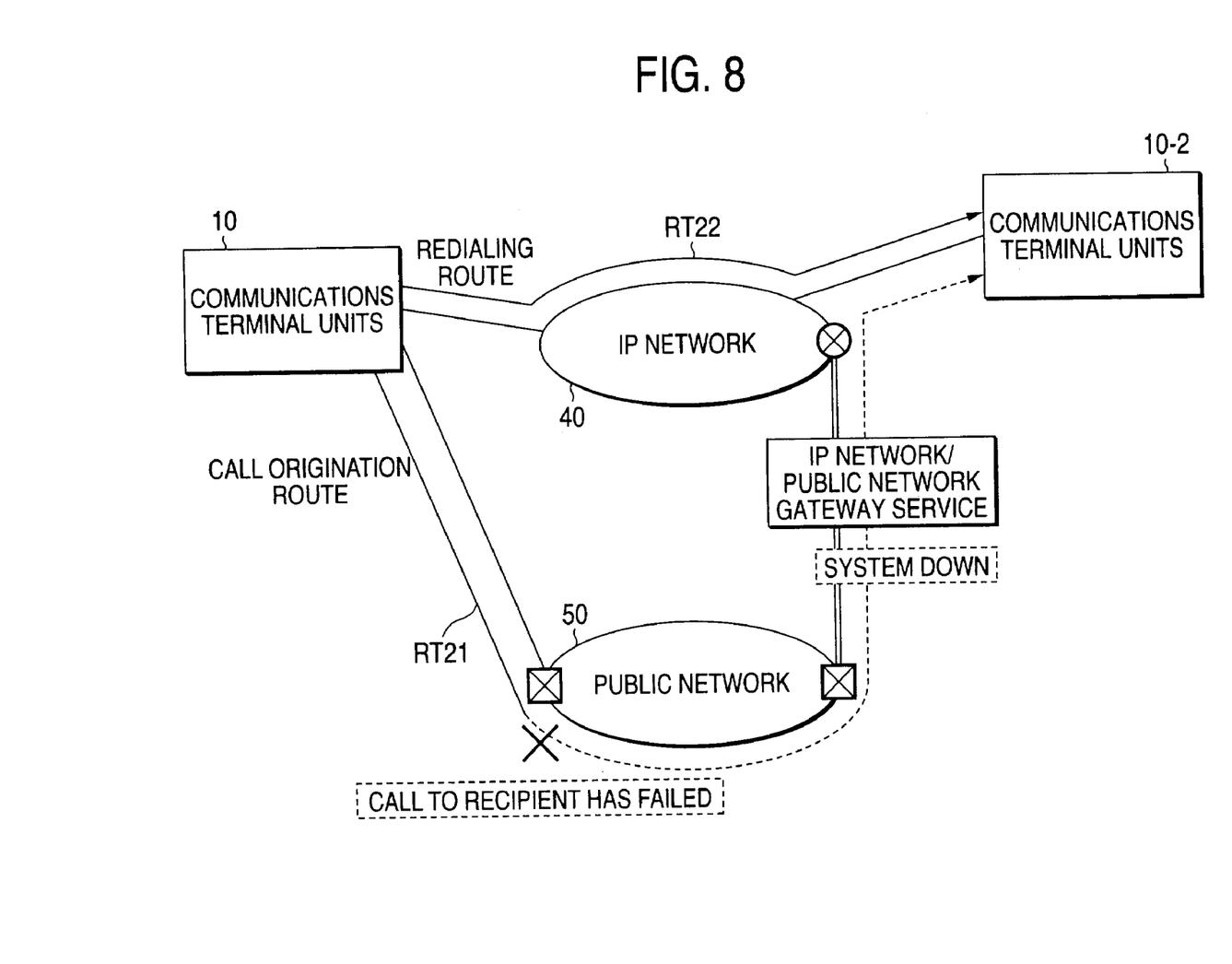
FIG. 8 is a conceptual rendering showing an example flow of communication based on control of operation for originating a call to the communication terminal unit of the third embodiment.

FIG. 8 is a conceptual rendering showing an example flow of communication based on control of operation for originating a call to the communication terminal unit 10 of the third embodiment (see FIG. 7).

As shown in FIG. 8, the communications terminal unit 10 is connected to the IP network 40 and the public network 50. The communications terminal unit 10-2 is connected solely to the IP network 40. Further, IP network/public network gateway service is provided between the IP network 40 and the public network 50.

There is conceived a situation in which, when the communications terminal unit 10 has originated a call in this connection environment by selection of the public network 50 in order to transmit a document to the communications terminal unit 10-2, a system down status has arisen in the local IP network/public network gateway service.

In this case, a call originated from the communication terminal unit 10 does not arrive at the communications terminal unit 10-2, thereby inducing a communication error. In the drawing, RT21 denotes a communication route which has been employed at this time (i.e., a call origination route).

At this time, the public network 50 returns, to the communication terminal unit 10 that is a call originator, a response indicating the system down status in the IP network/public network gateway service.

In the communications terminal unit 10, the communication error detection section 181 of the system control section 18 detects a communication error from the response, and the communication error analysis section 183 analyzes the communication error. On the basis of a result of analysis of the communication error, the call origination network determination section 185 determines origination of a call over the IP network 40, thereby originating a call over the IP network 40.

In the drawing, RT22 indicates a communication route (redialing route) required at this time.

In this case, a call (a redialed call) originated from the communications terminal unit 10 arrives at the communications terminal unit 10-2 (a device connected solely to the IP network) at the other end by way of the IP network 40. As a result, a call is established, thereby enabling communication with the communication terminal unit 10-2 by way of the communication route RT22.

In this way, the communications terminal unit 10 of the third embodiment originates a call over the public network 50 as a result of the user having selected the public network 50. However, when connection to the communications terminal unit at the other end cannot be established for reasons of a system down in the IP network/public network gateway service or the like, the call origination network determination section 185 determines origination of a call over the IP network 40, from the result of analysis of an error obtained at this time, and redials a call by selecting the IP network 40 as a network over which a call is to be originated.

By means of such control operation, even when a communication error has arisen as a result of a call having been originated over the public network 50, connection to the communications terminal unit at the other end can be made by originating a call while the network is switched to the IP network 40, thus recovering communication.

The call origination network switching control of the third embodiment may be implemented while being limited solely to origination of, particularly, a call to a number starting with "050."

Fourth Embodiment

Figure 9:
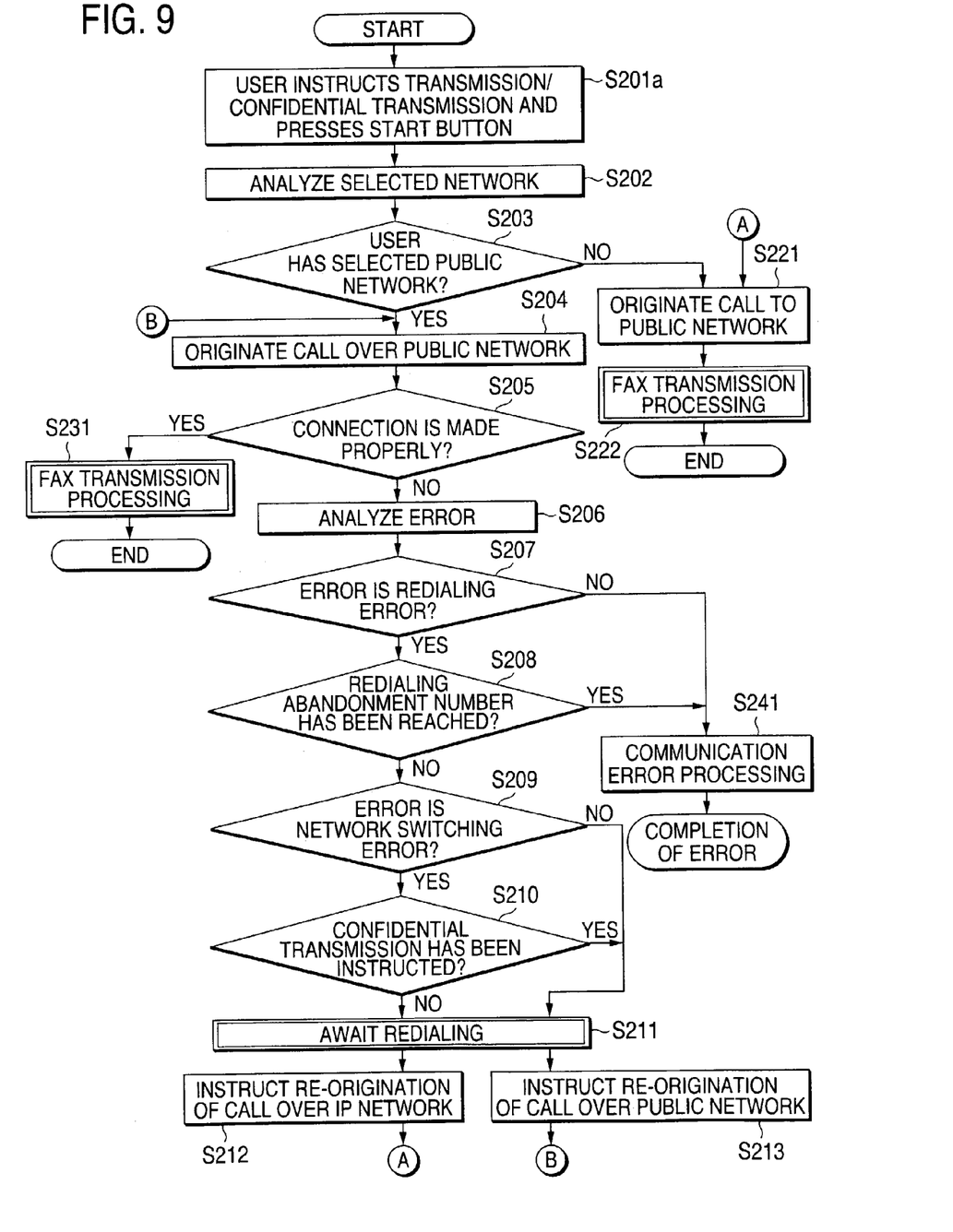
FIG. 9 is a flowchart showing call origination control operation of a communications terminal unit according to a fourth embodiment of the invention.

FIG. 9 is a flowchart showing call origination control operation of the communications terminal unit 10 according to a fourth embodiment of the invention.

The call origination control operation of the communications terminal unit 10 of the fourth embodiment is identical with that of the communications terminal unit 10 of the third embodiment, except for processing pertaining to steps S201a and S210.

Here, descriptions are primarily given of the processing pertaining to steps S201a and S210, and detailed explanations of processing pertaining to other steps are omitted.

When the communications terminal unit 10 of the fourth embodiment attempts to initiate communication (e.g., transmission of a document) with the communications terminal unit at the other end, the user enters the number of the communications terminal unit at the other end by utilization of a ten-key pad of the operation/display section 12, and selects a network over which a call is to be originated, through use of the network selection button. In the case of transmission of a document having high confidentiality, instruction of confidential transmission, such as pressing of a "confidential" button, is performed, and the user then presses a transmission start button, thus issuing a transmission instruction (step S201a).

Then, processing proceeds to steps S202 to S209. In step S209, when occurrence of a network switching error, such as a system down in the IP network/public network gateway service, is determined (when YES is selected in step S209), the call origination network determination section 185 checks whether or not the instruction corresponds to a "confidential transmission" instruction, by reference to the information entered at the time of call origination operation pertaining to step S201a (step S210).

Here, when the instruction is a "confidential transmission" instruction (when YES is selected in step S210), the call origination network determination section 185 determines origination of a call over the public network 50. After having awaited for only a period of time corresponding to a preset redialing interval (i.e., re-dialing awaiting operation) (step S211), the call origination network determination section 185 instructs the PSTN call/network control section 24 or the ISDN call/network control section 26 to originate a call over the public network 50 (step S213).

In accordance with the instruction, processing proceeds to step S204, where the PSTN call/network control section 24 or the ISDN call/network control section 26 originates a call over the public network 50. When connection is made properly after origination (when YES is selected in step S205), facsimile transmission to the communications terminal unit at the other end is performed (step S231) After completion of transmission, operation is terminated.

When the instruction is not a "confidential transmission" instruction (when NO is selected in step S210), the call origination network determination section 185 determines origination of a call over the IP network 40. After having awaited redialing operation in the manner mentioned previously (step S211), the call origination network determination section 185 instructs the IP network control section 21 to originate a call over the IP network 40 (step S212).

In accordance with the instruction, processing proceeds to step S221, where the IP network control section 21 originates a call over the IP network 40. When connection has been made after origination of a call, facsimile transmission to the communications terminal unit at the other end is performed (step S222), and operation is terminated by completion of transmission.

When a network is switched, a call may be originated immediately without awaiting redialing operation (step S211).

In this way, in relation to the communication terminal unit 10 of the fourth embodiment, in the case of transmission of a document having high confidentiality, the user instructs "confidential transmission," and enters the number (facsimile number) of the communications terminal unit at the other end by use of an interface (e.g., the operation/display section 12).

Settings are made such that a call is originated over the public network 50 in a prioritized manner. However, if for any reason an error arises in connection with the communications terminal unit at the other end by way of the public network 50, a check is made as to whether or not the "confidential transmission" is instructed (see S210 in FIG. 9).

When the "confidential transmission" is instructed, the call origination network determination section 185 selects the public network 50 as a network over which a call is to be originated. Further, redialing of a call is also performed over the public network 50.

If the "confidential transmission" is not instructed, the communication error analysis section 183 analyzes the type of the communication error. When having determined the possibility of making connection over the IP network 40, the call origination network determination section 185 redials a call while switching the network to the IP network 40.

As mentioned above, when a communication error has arisen as a result of origination of a call over the public network 50, a call is re-originated to the public network 50 only when "confidential transmission" is instructed, thereby maintaining confidentiality of the document to be transmitted.

The invention is not limited to the embodiments shown in the drawings and is susceptible to modifications falling within the scope of the invention, as required.

For instance, in the embodiments a facsimile machine is mentioned as an example of the communications terminal unit. However, the invention can be applied to general communications terminal units connected to both the IP network 40 and the public network 50 other than the facsimile machine; for example, a multifunctional apparatus having the features of a printer, those of a copier, and those of a facsimile machine.

As has been described, according to the invention, when a communication error is detected at the time of origination of a call over an IP network or a public switched telephone network, the communication error is analyzed. In accordance with a result of analysis, a determination is automatically made as to whether or not a call is to be re-originated over the IP network or over the public switched telephone network. Hence, even when a user has selected an inappropriate network, the network is automatically switched after detection of a communication error, thereby recovering communication and enhancing reliability of information to be transmitted.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A communications terminal unit connected to an IP network and a public switched telephone network, comprising:
    a first line connection section for establishing connection with the IP network when originating a call over the IP network;
    a second line connection section for establishing connection with the public switched telephone network when originating a facsimile transmission over the public switched telephone network;
    a communication error detection section for detecting occurrence of a communication error when the first line connection section or the second line connection section establish the connection;
    a communication error analysis section for analyzing whether the communication error is a result of a connection failure, a network switching error, or a redialing error; and
    a determination section for automatically determining whether to re-originate the call over the IP network or over the public switched telephone network in accordance with a result of analysis performed by the communication error analysis section when the communication error detection section has detected the communication error, wherein
    the determination section determines to re-originate the facsimile transmission over the public switched telephone network when the communication error detection section has detected the communication error at the time of originating the facsimile transmission over the IP network and when the facsimile transmission has a high degree of urgency.

2. The communications terminal unit as claimed in claim 1, wherein
    the determination section determines to re-originate the facsimile transmission over the public switched telephone network when the communication error detection section has detected the communication error at the time of originating the call over the IP network and when the communication error is unique to the IP network.

3. The communications terminal unit as claimed in claim 1, wherein
    the determination section determines to re-originate the call over the IP network when the communication error detection section has detected the communication error at the time of originating the facsimile transmission over the public switched telephone network and when the communication error is unique to the public switched telephone network.

4. A method for controlling a communications terminal unit which is connected to an IP network and a public switched telephone network and comprises:
    a first line connection section for establishing connection with the IP network when originating a call over the IP network;
    a second line connection section for establishing connection with the public switched telephone network when originating a facsimile transmission over the public switched telephone network, the method comprising operations for
    detecting occurrence of a communication error when the first line connection section or the second line connection section establish the connection;
    analyzing whether the detected communication error is a result of a connection failure, a network switching error, or a redialing error; and
    automatically determining whether to re-originate the call over the IP network or over the public switched telephone network in accordance with a result of analysis, wherein
    re-origination of the facsimile transmission over the public switched telephone network is determined when the communication error is detected at the time of originating the facsimile transmission over the IP network and when the facsimile transmission has a high degree of urgency.

5. The method for controlling a communications terminal unit as claimed in claim 4, wherein
    re-origination of the facsimile transmission over the public switched telephone network is determined when the communication error is detected at the time of originating the call over the IP network and when the communication error is unique to the IP network.

6. The method for controlling a communications terminal unit as claimed in claim 4, wherein
    re-origination of the call over the IP network is determined when the communication error is detected at the time of originating the facsimile transmission over the public switched telephone network and when the communication error is unique to the public switched telephone network.

7. The communications terminal unit as claimed in claim 1, wherein
    the determination section determines to re-originate the facsimile transmission over the public switched telephone network when the communication error detection section has detected the communication error at the time of originating the facsimile transmission over the public switched telephone network and when the facsimile transmission has a high degree of confidentiality.

8. The method for controlling a communications terminal unit as claimed in claim 4, re-origination of the call over the public switched telephone network is determined when the communication error is detected at the time of originating the facsimile transmission over the public switched telephone network and when the facsimile transmission has a high degree of confidentiality.

* * * * *